US005487769A

United States Patent [19]
Hutchinson et al.

[11] Patent Number: 5,487,769
[45] Date of Patent: Jan. 30, 1996

[54] INTEGRAL APPARATUS FOR SEPARATING LUBRICANT FROM A HOT COMPRESSED GAS AND FOR COOLING THE SEPARATED LUBRICANT

[75] Inventors: William R. Hutchinson; Daniel T. Martin, both of Clemmons, N.C.

[73] Assignee: Ingersoll-Rand Company, Woodcliff Lake, N.J.

[21] Appl. No.: 313,496

[22] Filed: Sep. 27, 1994

[51] Int. Cl.$^6$ ................................................. B01D 45/00
[52] U.S. Cl. ................................ 55/442; 55/444; 55/465; 55/466; 55/DIG. 17
[58] Field of Search ........................... 55/442, 444, 465, 55/228, DIG. 17, 466; 210/175, 180, 168

[56] References Cited

U.S. PATENT DOCUMENTS

| | | | |
|---|---|---|---|
| 3,654,748 | 4/1972 | Bloom | 55/465 X |
| 3,934,990 | 1/1976 | Ide, III | 55/218 |
| 4,070,166 | 1/1978 | Emanuelsson | 55/41 |
| 4,531,955 | 7/1985 | Cash et al. | 55/465 X |
| 4,668,252 | 5/1987 | Gedan | 55/465 X |
| 4,761,166 | 8/1988 | Kitchener et al. | 55/385 R |
| 5,029,448 | 7/1991 | Carey | 62/84 |
| 5,302,300 | 4/1994 | Porri | 210/774 |

FOREIGN PATENT DOCUMENTS

PCT/AU93/
00062  2/1993  Australia .

*Primary Examiner*—Robert J. Warden
*Assistant Examiner*—Krisanne M. Thornton
*Attorney, Agent, or Firm*—Victor M. Genco, Jr.

[57] ABSTRACT

An integral separator and cooling apparatus is provided for removing a lubricant from a heated, compressed lubricant and gas mixture, and for cooling the separated lubricant. The apparatus includes a lubricant reservoir for containing a liquid lubricant. A receiving plenum is made integral with the lubricant reservoir. The receiving plenum has an inlet for receiving the heated, compressed lubricant and gas mixture, a first outlet through which a heated, compressed gas exits, and a second outlet through which the separated lubricant flows from the receiving plenum. An apparatus is provided within the receiving plenum which causes a liquid lubricant to precipitate from the lubricant and gas mixture. A cooling core is made integral with the lubricant reservoir and the receiving plenum. The cooling core fluidly communicates with the lubricant reservoir and with the receiving plenum. The cooling core includes: a header apparatus mounted on the cooling core, a first flow passage which extends from the second outlet of the receiving plenum to the header apparatus, and a second flow passage which extends from the header apparatus to the lubricant reservoir. An apparatus directs a flow of cooling fluid across the first and second flow passages in response to a control signal from a thermal control apparatus.

9 Claims, 3 Drawing Sheets

INTEGRAL APPARATUS FOR SEPARATING LUBRICANT FROM A HOT COMPRESSED GAS AND FOR COOLING THE SEPARATED LUBRICANT

BACKGROUND OF THE INVENTION

This invention generally relates to compressed fluid systems, and more particularly to an integral separator and cooling apparatus for use in combination with an oil-flooded compressor.

Oil-flooded compressors, such as oil-flooded rotary screw compressors, compress fluids, such as air, to predetermined pressures. As is well known in the art, much heat is generated during the compression of air. Accordingly, lubricants, such as machine oil for example, are injected at predetermined points in the compressor to cool compressed air and to lubricate predetermined contacting surfaces of the compressor. As a result of the injection of oil into the compressed air, a mixture of compressed air and oil is discharged from the compressor.

Present oil-flooded compressor systems employ many discrete assemblies for accomplishing air-oil separation, oil cooling, air cooling, oil temperature control, and oil containment. Such discrete assemblies include, but are not limited to, pressurized separator tanks, heat exchangers or oil coolers, and temperature regulating valves. These discrete devices require extensive interconnecting piping and fittings, which increase manufacturing costs. Additionally, the utilization of a plurality of discrete assemblies for each compressed fluid system increases the length of the manufacturing process. Finally, the use of multiple system components, piping, hoses, and connecting fittings decreases the reliability of the overall system and increases the risk of oil leakage.

The foregoing illustrates limitations known to exist in present oil-flooded compressor systems. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an integral separator and cooling apparatus for use in combination with a compressed fluid system. The integral separator and cooling apparatus removes a lubricant from a heated, compressed lubricant and gas mixture, and cools the separated lubricant. The fluid system includes an apparatus for compressing a gas, the integral separator and cooling apparatus, and a fluid powered device. The integral separator and cooling apparatus includes a cooling core having a first flow channel portion and a second flow channel portion. A receiving plenum is mounted on the cooling core. The receiving plenum fluidly communicates with the first flow channel portion of the cooling core. The receiving plenum has a gas inlet for a heated, compressed lubricant and gas mixture, and a gas outlet for a heated, compressed gas. An apparatus is provided for precipitating a liquid lubricant from the heated, compressed lubricant and gas mixture. The liquid lubricant precipitating apparatus is disposed within the receiving plenum. A lubricant reservoir is mounted on the cooling core. The lubricant reservoir fluidly communicates with the second flow channel portion of the cooling core. An apparatus directs a flow of cooling fluid across the first and second flow channels in response to a signal from a thermal control apparatus which actuates the cooling fluid directing apparatus in response to the temperature of the lubricant within the lubricant reservoir.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
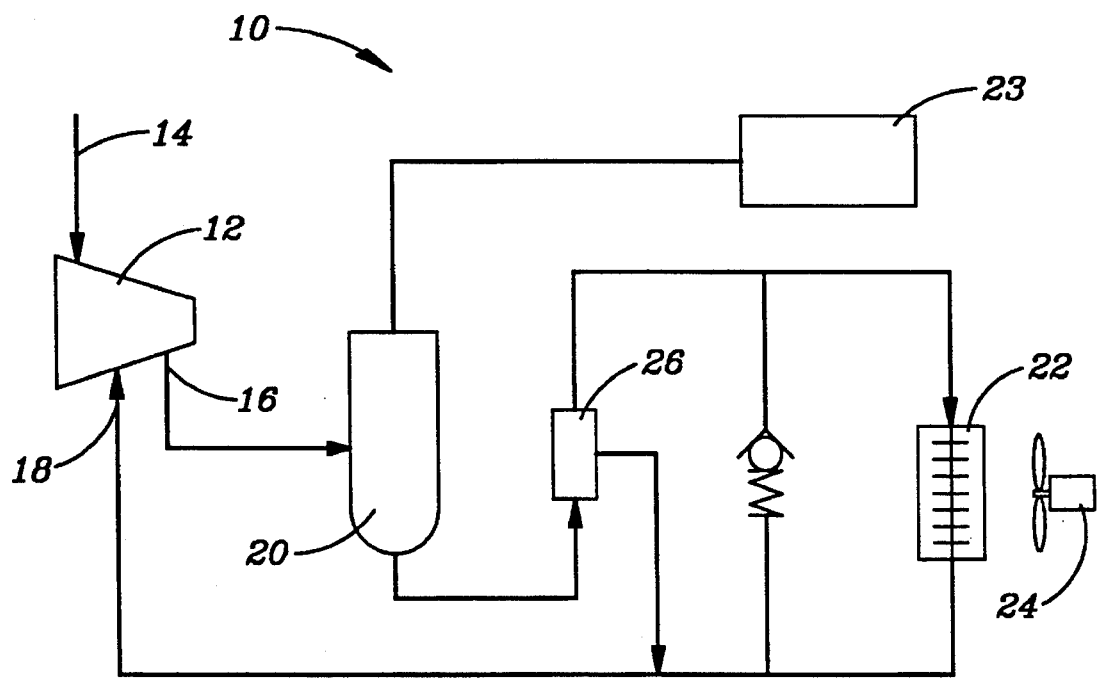
FIG. 1 illustrates a functional diagram of a prior art compressed fluid system having an oil-flooded rotary screw compressor.

Referring now to the drawings, wherein similar reference characters designate corresponding parts throughout the several views, FIG. 1 illustrates a functional diagram of a prior art compressed fluid system which is illustrated generally at 10. The compressed fluid system 10 includes an oil-flooded compressor 12, such as an oil-flooded rotary screw compressor, for example. Compressor 12 includes an inlet 14 and a discharge 16. Oil is injected at predetermined locations 18 on the compressor 12 primarily for cooling compressed air during the compression process, and for lubricating contacting surfaces of the compressor. A mixture of heated, compressed air and oil is discharged from the compressor 12 at the compressor discharge 16 and flows to a separator vessel 20.

The separator vessel 20 prevents liquid oil carryover to the compressed air system. Typically, the separator achieves a level of less than 10 parts per million (by weight) of oil within the compressed air discharged from the compressor 12. Additionally, the separator vessel 20 provides a reservoir for the containment of the total oil volume within the compressed air system 10.

"Hot" liquid oil flows from the separator vessel 20 to a heat exchanger 22 which cools the heated, compressed air to a predetermined suitable temperature for use by a fluid powered device 23. The heat exchanger 22 may be air-cooled, such as by employing a fan 24. Alternatively, the heat exchanger 22 may be water-cooled. The compressed air system 10 of FIG. 1 also includes a thermostatically controlled, temperature-regulating valve 26. Temperature-regulating valve 26 operates to bypass a portion of the total oil flow around the heat exchanger 22 so that the temperature of the oil injected into the compressor 12 is within a predetermined temperature range. As is well known, some compressed air applications may require "cleaner" air (i.e. compressed air having less entrained oil). In such instances, additional conventional downstream filtering devices may be employed to accomplish further reductions in the level of entrained oil within the compressed air.

Figure 2:
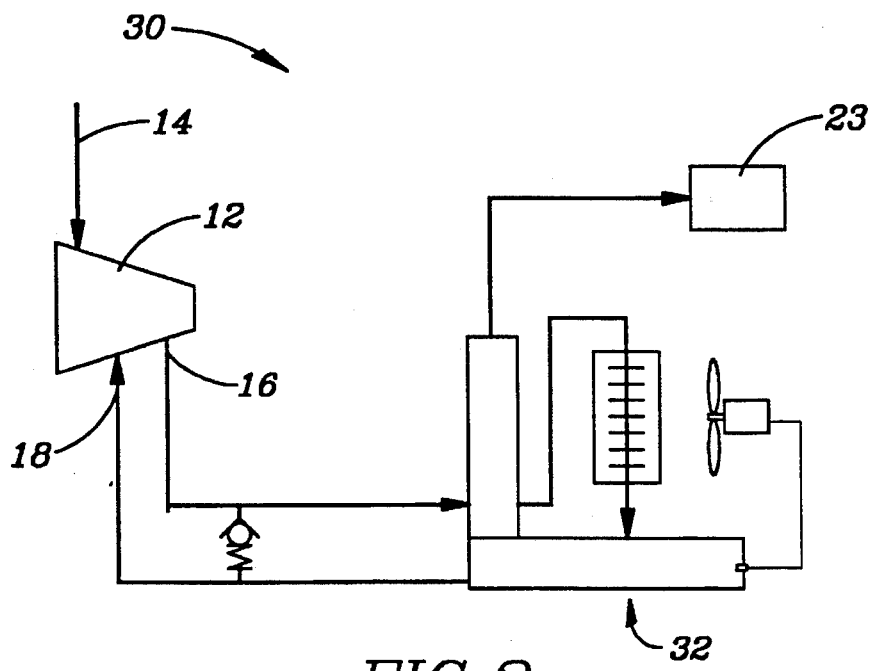
FIG. 2 illustrates a functional diagram of a fluid system in accordance with the teachings of the present invention.
Figure 3:
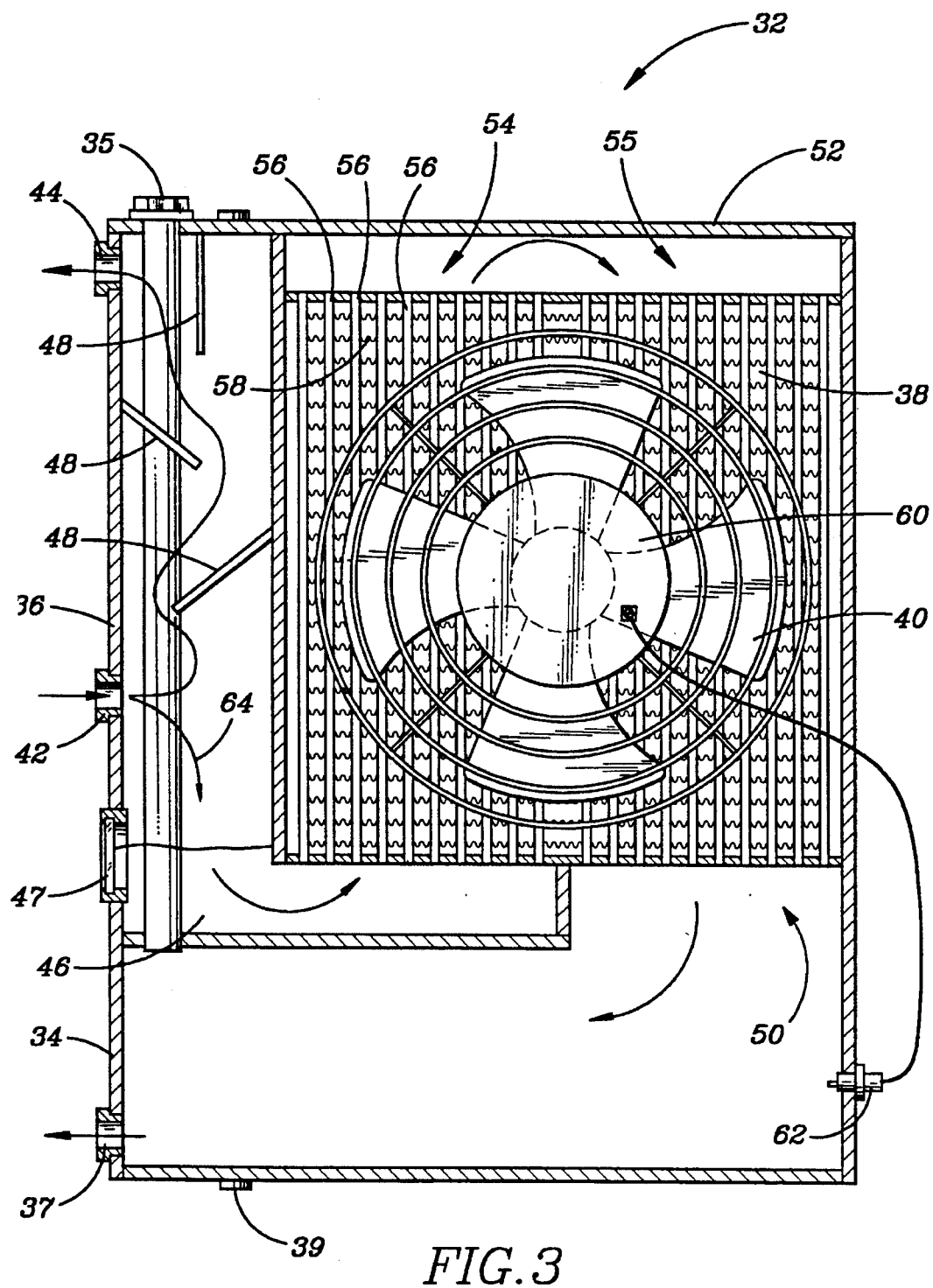
FIG. 3 is a partial, front view of an integral separator and cooling apparatus for removing a lubricant, such as oil, from a heated, compressed lubricant and gas mixture, and for cooling the separated lubricant in accordance with the teachings of the present invention.
Figure 4:
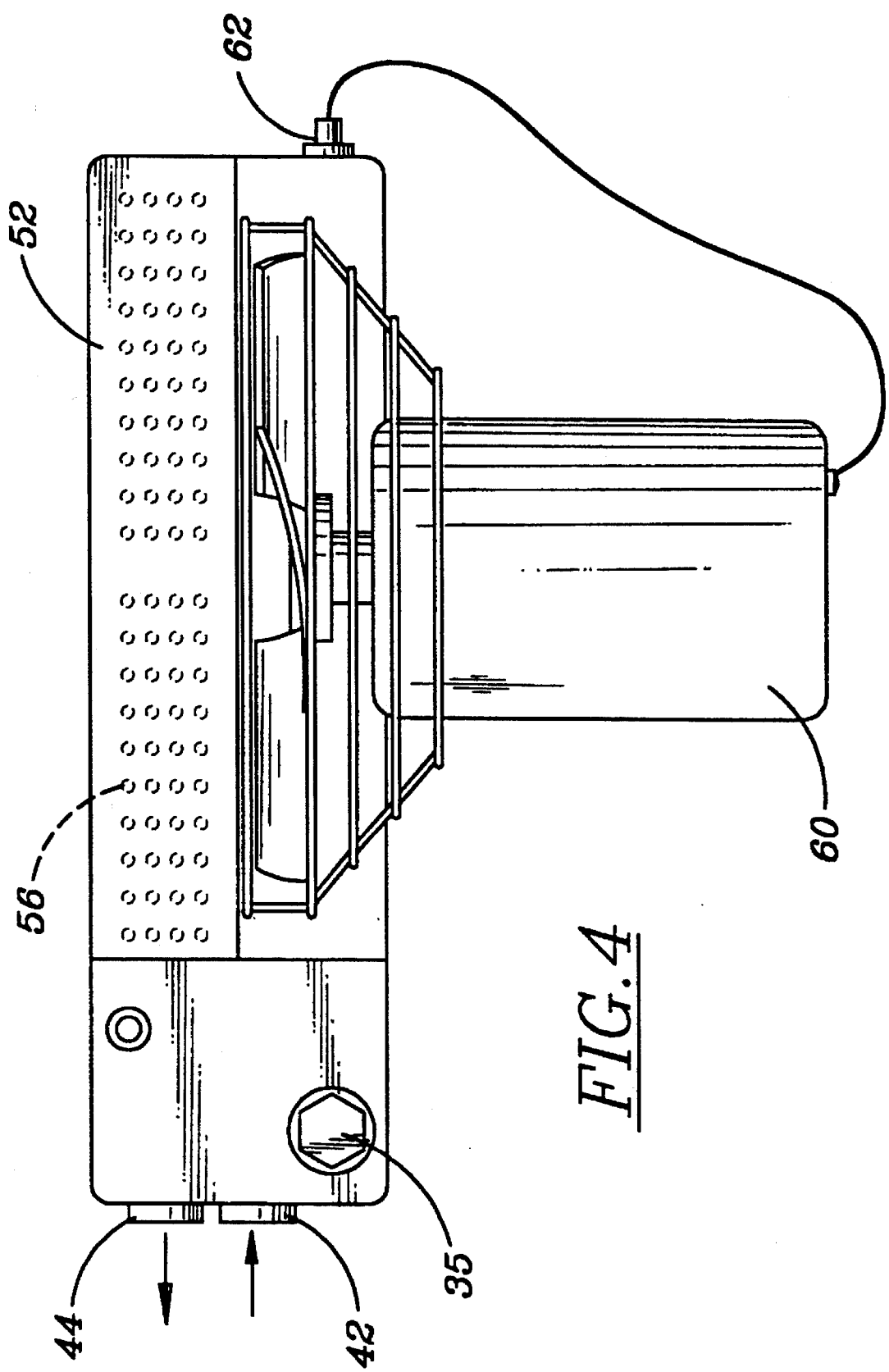
FIG. 4 is a top view of the integral separator and cooling apparatus illustrated in FIG. 3.

FIG. 2 illustrates a functional diagram of a fluid system which, in accordance with the present invention, includes an integral separator and cooling apparatus 32 for removing a lubricant from a heated, compressed lubricant and gas mixture, and for cooling the separated lubricant. The integral separator and cooling apparatus 32 is illustrated in FIG. 3, and is described in further detail hereinafter.

The integral separator and cooling apparatus 32 includes a lubricant reservoir 34, a receiving plenum 36, a cooling core 38, and a cooling fluid flow directing means 40. The lubricant reservoir 34 generally provides for the containment of all the lubricant or oil used by the compressed air system 30. The lubricant reservoir 34 may include a lubricant fill tube 35 which may extend through the receiving plenum 36 to provide for easy servicing of the compressed air system 30. Additionally, the lubricant reservoir fluidly communicates with an outlet 37 through which lubricant flows to the compressor 12 for use during compressor operation. The lubricant reservoir also may include a drain 39.

The receiving plenum 36 is mounted on, or otherwise made integral with, the lubricant reservoir 34. The receiving plenum has an inlet 42 for receiving a heated, compressed oil and gas mixture which has been discharged by the compressor 12. Also, the receiving plenum 36 includes a first outlet 44 through which a heated, compressed gas exits for use by a fluid powered device, and a second outlet 46 through which the separated lubricant flows from the receiving plenum. The receiving plenum 36 may also include a lubricant level gauge, such as a sight glass type gauge 47. As should be understood, the flow of compressed fluid through the receiving plenum is generally from the inlet 42 to the first outlet 44.

Mounted within the receiving plenum 36 is a means 48 for disrupting the compressed fluid flow from the inlet 42 to the first outlet 44 for the purpose of precipitating a liquid lubricant from the heated, compressed lubricant and gas mixture. In the preferred embodiment, the compressed fluid flow disrupting means comprises a plurality of plate members, baffles, wall members, or screens, or any other such device for deflecting, checking, disrupting or otherwise regulating the flow of compressed fluid within the receiving plenum. The plurality of plate members affects the direction and velocity of the heated, compressed lubricant and gas mixture as the mixture flows from the receiving plenum inlet 42 to the first outlet of the receiving plenum 44.

The cooling core 38 is mounted on, or otherwise made integral with, the lubricant reservoir 34 and the receiving plenum 36. The cooling core 38 fluidly communicates with the lubricant reservoir at a location generally indicated by the numeral 50, and with the receiving plenum at the second outlet 46. The cooling core 38 includes a header apparatus 52 which is mounted on the cooling core, and first and second flow passages or flow channels. The first and second flow passages are generally indicated at 54 and 55 respectively. The first flow passage 54 extends from the second outlet 46 of the receiving plenum 36 to the header apparatus 52. The first flow passage 54 is defined by a plurality of flow channels 56 which have fins 58 mounted on an exterior flow channel surface. The second flow passage 55 extends from the header apparatus 52 to the lubricant reservoir 34. The second flow passage 55 is defined by a plurality of flow channels 56 which have fins 58 mounted on an exterior flow channel surface. Cooling fluid, such as air is directed over the finned flow channels by any suitable apparatus, such as a fan 60 for example. In the preferred embodiment of the present invention, the temperature of the oil within the reservoir 34 is controlled by way of a thermostat or thermal switch 62, which is explained in further detail hereinafter.

OPERATION

In operation of the compressed air system 30 of the present invention, a heated, compressed oil and air mixture flows from the discharge 16 of the air compressor 12 to the integral separator and cooling apparatus 32, by way of the intake 42 of the receiving plenum 36. This mixture is pressurized to a pressure of from about 100 psig to about 350 psig. Typically, the temperature of the mixture ranges from about 180° F. to about 248° F.

Upon entry into the integral separator and cooling apparatus 32, a significant portion of the liquid oil which has been entrained within the compressed air immediately "separates" from the air/oil mixture and drops downward to a lower portion of the receiving plenum, as indicated by the arrow 64. The remaining heated, compressed mixture of air and oil flows upward across the series of sloped plate members 48, which alter the direction and velocity of the air/oil mixture. The resulting direction changes to the air/oil mixture cause additional entrained oil to precipitate from the heated, compressed air and oil mixture. Accordingly, the heated, compressed air exiting the plenum at the first outlet 44 contains liquid oil at a significantly lower level than the level of oil that was present within the air/oil mixture upon entry into the receiving plenum. In applications where cleaner air is desired, a secondary oil separation unit may be employed for further cleaning of the air. This secondary oil separation unit may be of the spin-on element type where a combination of centrifugal motion and coalescing technologies are used for further oil separation.

The separated oil in the lower portion of the receiving plenum exits the receiving plenum at the second outlet 46. This separated oil is typically at a temperature equal to that of the heated, compressed air/oil mixture at the discharge 16 of the compressor 12. The separated oil is caused by pressure differential to flow upward through the first flow passage 54 to the header apparatus 52, and downward through the second flow passage 55. After exiting the second flow passage, the cooled oil enters the lubricant reservoir 34. The cooled oil is then made to flow by pressure differential through the outlet 37 to the compressor 12 where the oil is reinjected for lubrication and cooling at the predetermined locations 18.

Cooling air is made to flow over the first and second flow passages by the fan 60. The fan may be either electric-motor driven, belt-driven, or direct driven from a prime mover, and may be either of the axial-flow, centrifugal-type, or mixed-flow type. The cooling air flowing across the first and second flow passages cools the liquid oil flowing therein. Typically, the oil is cooled to about 30° F. to 50° F. less than the temperature of the heated, compressed air/oil mixture at the discharge 16 of the compressor 12.

Temperature control of the separated oil within the lubricant reservoir 34 is accomplished by use of the thermostat 62 to control the operation of the electric-motor driven fan. When the cooled oil in the lubricant reservoir 34 rises to a certain predetermined temperature, the thermal switch (or thermostat) 62 closes which applies electricity either directly or indirectly to the electric motor driving the fan. Cooling air is then delivered to the first and second flow passages 54 and 55, respectively. When the cooled oil drops to a second predetermined level of temperature, the thermal switch opens which stops the cooling fan from rotating. By this method, the temperature of the cooled oil being delivered to the airend is held within a certain predetermined band of temperature.

While this invention has been illustrated and described in accordance with a preferred embodiment, it is recognized that variations and changes may be made therein without departing from the invention as set forth in the following claims.

Having described the invention, what is claimed is:

1. An apparatus comprising:

a cooling core having a first flow channel portion and a second flow channel portion;

a receiving plenum made integral with the cooling core, the receiving plenum fluidly communicating with the first flow channel portion of the cooling core, the receiving plenum having a gas inlet for a heated, compressed lubricant and gas mixture, and a gas outlet for a heated, compressed gas;

a means for precipitating a liquid lubricant from the heated, compressed lubricant and gas mixture, the liquid lubricant precipitating means being disposed within the receiving plenum;

a lubricant reservoir made integral with the cooling core, the lubricant reservoir fluidly communicating with the second flow channel portion of the cooling core;

a means for directing a flow of cooling fluid across the first and second flow channels; and a thermal control means for controlling the cooling fluid directing means in response to the temperature of lubricant within the lubricant reservoir.

2. An apparatus, as claimed in claim 1, further including a header apparatus mounted on the cooling core, the header apparatus fluidly communicating with both the first and second flow channel portions.

3. An apparatus, as claimed in claim 1, and wherein the means for precipitating a liquid lubricant from the heated, compressed lubricant and gas mixture comprises a plurality of plate members which are disposed within the receiving plenum in a predetermined fashion such that the flow direction of the heated, compressed lubricant and gas mixture within the receiving plenum is altered, thereby causing liquid lubricant to separate from the compressed lubricant and gas mixture.

4. An apparatus, as claimed in claim 1, and wherein the lubricant reservoir includes a lubricant fill tube which extends through the receiving plenum.

5. An apparatus, as claimed in claim 1, and wherein the means for directing a flow of cooling fluid across the first and second flow channel portions is an electric fan.

6. An apparatus, as claimed in claim 5, and wherein the thermal control means electrically actuates the fan.

7. An apparatus comprising:

a cooling core having a first flow channel portion and a second flow channel portion fluidly separated from the first flow channel portion;

a header apparatus mounted on the cooling core, the header apparatus fluidly communicating with both the first and second flow channel portions;

a receiving plenum mounted on the cooling core, the receiving plenum fluidly communicating with the first flow channel portion of the cooling core, the receiving plenum having a gas inlet for a heated, compressed lubricant and gas mixture and a gas outlet for a heated, compressed gas;

a means for precipitating a liquid lubricant from the heated, compressed lubricant and gas mixture, the liquid lubricant precipitating means being disposed within the receiving plenum;

a lubricant reservoir mounted on the cooling core, the lubricant reservoir fluidly communicating with the second flow channel portion of the cooling core;

a means for directing a flow of cooling fluid across the first and second flow channels; and a thermal control means for controlling the cooling fluid directing means in response to the temperature of lubricant within the lubricant reservoir.

8. An integral separator and cooling apparatus for removing a lubricant from a heated, compressed lubricant and gas mixture, and for cooling the separated lubricant, the apparatus comprising:

a lubricant reservoir;

a receiving plenum made integral with the lubricant reservoir, the receiving plenum having an inlet for receiving the heated, compressed lubricant and gas mixture, a first outlet through which a heated, compressed gas exits, and a second outlet through which the separated lubricant flows from the receiving plenum;

a means for disrupting a flow of the heated, compressed lubricant and gas mixture within the receiving plenum, the flow disrupting means affecting the direction and velocity of the heated, compressed lubricant and gas mixture as the mixture flows from the receiving plenum inlet to the first outlet of the receiving plenum;

a cooling core made integral with the lubricant reservoir and the receiving plenum, the cooling core fluidly communicating with the lubricant reservoir and with the receiving plenum at the second outlet, the cooling core including:

(a) a header apparatus mounted on the cooling core;

(b) a first flow passage extending from the second outlet of the receiving plenum to the header apparatus;

(c) a second flow passage extending from the header apparatus to the lubricant reservoir;

a means for directing a flow of cooling fluid across the first and second flow passages; and a thermal control means for controlling the cooling fluid directing means in response to the temperature of lubricant within the lubricant reservoir.

9. A fluid system comprising:

a means for compressing a gas;

an integral separator and cooling apparatus for removing a lubricant from a heated, compressed lubricant and gas mixture, and for cooling the separated lubricant, the integral separator and cooling apparatus including, (a) a cooling core having a first flow channel portion and a second flow channel portion;

(b) a receiving plenum mounted on the cooling core, the receiving plenum fluidly communicating with the first flow channel portion of the cooling core, the receiving plenum having a gas inlet for a heated, compressed lubricant and gas mixture, and a gas outlet for a heated, compressed gas;

(c) a means for precipitating a liquid lubricant from the heated, compressed lubricant and gas mixture, the liquid lubricant precipitating means being disposed within the receiving plenum;

(d) a lubricant reservoir mounted on the cooling core, the lubricant reservoir fluidly communicating with the second flow channel portion of the cooling core;

(e) a means for directing a flow of cooling fluid across the first and second flow channels;

(f) a thermal control means for controlling the cooling fluid directing means in response to the temperature of lubricant within the lubricant reservoir; and a fluid powered device disposed in fluid receiving relation with the gas outlet of the receiving plenum.

* * * * *